(12) United States Patent
Farr et al.

(10) Patent No.: US 10,667,543 B2
(45) Date of Patent: Jun. 2, 2020

(54) FROZEN CONFECTION

(71) Applicant: Conopco, Inc., Englewood Cliffs, NJ (US)

(72) Inventors: Robert Stanley Farr, Bedford (GB); Gerrit Jan Willem Goudappel, Hellevoetsluis (NL); Henk Husken, Barendrecht (NL); Daniel Anthony Jarvis, Varaignes (FR); Anke Kuijk, Eerbeek (NL); Sandra Joyce Veen, Rotterdam (NL); Krassimir Petkov Velikov, Utrecht (NL); Pieter Broer van der Weg, Berkel en Rodenrijs (NL)

(73) Assignee: Conopco, Inc., Englewood Cliffs, NJ (US)

( * ) Notice: Subject to any disclaimer, the term of this patent is extended or adjusted under 35 U.S.C. 154(b) by 166 days.

(21) Appl. No.: 15/536,384

(22) PCT Filed: Dec. 18, 2015

(86) PCT No.: PCT/EP2015/080481
§ 371 (c)(1),
(2) Date: Jun. 15, 2017

(87) PCT Pub. No.: WO2016/102362
PCT Pub. Date: Jun. 30, 2016

(65) Prior Publication Data
US 2017/0360063 A1  Dec. 21, 2017

(30) Foreign Application Priority Data

Dec. 22, 2014  (EP) ....................................... 4199581
Jan. 6, 2015  (EP) ....................................... 5150160

(51) Int. Cl.
  *A23G 9/42*  (2006.01)
  *A23G 9/32*  (2006.01)
  *A23G 9/38*  (2006.01)

(52) U.S. Cl.
  CPC .................. *A23G 9/42* (2013.01); *A23G 9/32* (2013.01); *A23G 9/38* (2013.01); *A23V 2002/00* (2013.01)

(58) Field of Classification Search
  CPC .............. A23G 9/32; A23G 9/38; A23G 9/42
  USPC ......................................................... 426/565
  See application file for complete search history.

(56) References Cited

U.S. PATENT DOCUMENTS

| | | |
|---|---|---|
| 3,671,268 A | 6/1972 | Blake et al. |
| 3,826,829 A | 7/1974 | Marulich |
| 4,923,981 A | 5/1990 | Weibel et al. |
| 4,954,360 A | 9/1990 | Barnett |
| 6,485,767 B1 * | 11/2002 | Cantiani ............... A23L 29/262 426/96 |
| 2006/0251789 A1 | 11/2006 | Lundberg et al. |
| 2011/0293813 A1 | 12/2011 | Cavallini et al. |

FOREIGN PATENT DOCUMENTS

| | | |
|---|---|---|
| CN | 101057628 | 10/2007 |
| EP | 0295865 | 12/1988 |
| EP | 1602283 | 7/2005 |
| JP | 59-042850 A | 3/1984 |
| WO | WO9115517 | 10/1991 |
| WO | WO0249451 | 6/2002 |
| WO | WO03020869 | 3/2003 |
| WO | WO2004091305 A1 | 10/2004 |
| WO | WO2005058058 A1 | 6/2005 |
| WO | WO2005115163 | 12/2005 |
| WO | WO2007112504 | 10/2007 |
| WO | WO2009019088 | 2/2009 |
| WO | WO2012072335 | 6/2012 |
| WO | WO2013044049 | 3/2013 |
| WO | WO13109721 | 7/2013 |
| WO | WO2014095307 | 6/2014 |
| WO | WO2014095323 | 6/2014 |

OTHER PUBLICATIONS

Brownstein et al., Spin-Lattice Relaxation in a System Governed by Diffusion, Journal of Magnetic Resonance, 1977, pp. 17-24, vol. 26, Issue 1.
Carr et al., Effects of Diffusion on Free Precession in Nuclear Magnetic Resonance Experiments, Physical Review, May 1954, pp. 630-638, vol. 94, No. 3.
Chatsisvili et al., Physicochemical properties of a dressing-type o/w emulsion as influenced by orange pulp fiber incorporation, LWT-Food Science and Technology, Aug. 23, 2011, 335-340 (also as XP002680174), 46, No. 1, Elsevier.
Clarke et al., Ice Structuring Proteins—A New Name for Antifreeze Proteins, CryoLetters, 2002, 89-92, 23.
Darby Harris, Vincent Bulone, Shi-You Ding, and Seth Debolt, Tools for Cellulose Analysis in Plant Cell Walls, Plant Physiology, Jun. 2010, pp. 420-426, vol. 153.
Donald E. Pszczola, Gum System Solutions, Institute of Food Technologist, 2013, pp. 40-52, Issue 10.
Hou-Pin Su et al, Development of low-fat mayonnaise containing polysaccharide gums as functional ingredients, Journal Science Food Agri, 2010, pp. 806-812, vol. 90.
IPRP in PCTEP2015080481, Apr. 12, 2017.
Lawson, C.L. and R.J. Hanson, Linear Inequality Constraints, Solving Least Squares Problems, 1974, p. 161, Chapter 23.

(Continued)

*Primary Examiner* — Jyoti Chawla
(74) *Attorney, Agent, or Firm* — Gerard J. McGowan, Jr.

(57) ABSTRACT

The present invention is in the field of frozen compositions. In particular, the invention relates to frozen compositions of the water ice type. The invention provides frozen confections comprising water, a freezing point depressant and defibrillated primary cell wall material comprising microfibrils. The invention also relates to a method for preparing a frozen confection comprising water, a freezing point depressant and defibrillated primary cell wall material comprising microfibrils, wherein the method includes a high shear treatment step.

12 Claims, 3 Drawing Sheets

(56) References Cited

OTHER PUBLICATIONS

M. Dervisoglu and F. Yazici, The Effect of Citrus Fibre on the Physical, Chemical and Sensory Properties of Ice Cream, Food Science and Technology International, Apr. 2006, pp. 159-164—with abstract, 12.
Marshall et al., Stabilizers and Emulsifiers, Ice Cream 5th Edition, 1996, pp. 71-79, 5th Edition.
Meiboom, S., Gill, D, Modified SpinEcho Method for Measuring Nuclear Relaxation Times, AIP Review of Scientific Instruments, Aug. 1958, pp. 688-691, vol. 29, No. 8.
Pedersen et al., Towards Rapid and Unique Curve Resolution of Low-Field NMR Relaxation Data: Trilinear Slicing versus Two-Dimensional Curve Fitting, Journal of Magnetic Resonance, 2002, pp. 141-155, vol. 157, Issue 1.
Robert T. Marshall and W.S. Arbuckle, The Ice Cream Industry, Ice Cream, 1995, pp. 1-9, 5th Edition.
Search Report & Written Opinion in PCTEP2015080481, dated Mar. 14, 2016.
Search Report in EP14199581, dated Jun. 2, 2015.
Written Opinion 2 in PCTEP2015080481, dated Nov. 29, 2016.
Written Opinion in EP14199581, dated Jun. 2, 2015.

\* cited by examiner

FROZEN CONFECTION

FIELD OF THE INVENTION

The present invention is in the field of frozen compositions. In particular, the invention relates to frozen compositions of the water ice type. The invention also relates to a method for preparing a frozen confection.

BACKGROUND TO THE INVENTION

Classical water ices are typically frozen sugar solutions flavoured with fruits, yet without added milk protein and fat (see Ice cream. 5th edition. Edited by Robert T. Marshall and W. S. Arbuckle. Chapman & Hall, Chapter 1, p 1-2.). Such compositions are usually non-aerated or very little aerated. Due these characteristics, water ices and related frozen confections may turn very hard. Therefore such water ices have a relatively unattractive mouthfeel and may be unpleasant to eat. Even though there are ingredients that may help to soften water ices somewhat, there remains the general problem that such water ices tend to harden upon storage under frozen conditions. This so-called post-hardening therefore reduces the possibility of making softer water ices which maintain their attractive sensory characteristics during a typical commercially relevant shelf life. Other water ice-based confectionaries suffer from the same hardening upon storage. In the case of water ice based frozen drinks this will lead to a perceptible aggregates of ice crystals giving an unpleasant mouthfeel. Likewise, it is impossible to make soft ice-like confections based on a water ice format, using a scraped surface heat-exchanger as is typically used for ice creams, because such formulations would relatively quickly become impossible to extrude.

One way of making water ices softer would be to increase the sugar content, but this would increase the caloric content of the confection, which is perceived as unattractive by many health-aware consumers. The same applies to the addition of oils and fats. Moreover, addition of oils and fats would make turn the water ice into an ice cream, which is not what consumers expect from a water ice.

Different types of additives have heretofore been explored to modify and/or enhance the organoleptic properties of water ices. Notably, such additives include hydrocolloids such as gums. However, using gums at levels at which they would suppress post-hardening would yield water ices that give rise to an unpleasantly slimy or sticky mouthfeel once they are molten. Insoluble dietary fibres, such as cellulose fibres, have also been investigated, mainly for their use as stabilisers and shape retention aids.

For example, WO 2012/072335 relates to the use of enzyme-treated citrus fibre as a stabiliser in ice-cream. It discloses in its Table 1 a frozen confection (Formulation 1) that comprises 0.75 wt-% citrus fibre. The formulation was homogenised at a pressure of 140 bar and enzyme-treated before being frozen.

JP 59/042,850-A discloses an ice dessert composition comprising microfibrillated cellulose obtained from wood pulp as a stabiliser.

U.S. Pat. No. 4,923,981 relates to use of parenchymal cell cellulose to improve comestibles. It discloses that the addition of parenchymal cell cellulose to foodstuffs, drugs and other comestibles can improve the physical, physicochemical and stability properties of such materials.

In view of the above, there remains a need to provide novel ways to reduce or suppress post-hardening of water ices.

It is therefore an object of the present invention to provide a frozen confection that overcomes one or more of the problems observed in the prior art as described above.

In particular, it is an object of the present invention to provide frozen confections including water ices and related product formats which suffer less or not at all from post-hardening effects.

It is another object of the invention to provide frozen confections based on the water ice product format that retain their intended relative hardness over their commercial shelf life.

It is yet another object of the invention to reduce or even suppress post-hardening in water ices and/or related product formats, whilst maintaining other desirable characteristics.

It is a further object of the invention to provide a method to manufacture frozen confections that exhibit reduced or suppressed post-hardening.

Definition of the Invention

We have found that one or more of these objects can be achieved by the frozen confection of the present invention. In particular, it was surprisingly found that primary cell wall material comprising microfibrils, which has been defibrillated to a suitable level, such that the microfibril availability parameter of the confection, the homogeneity parameter of the confection, the fibre defibrillation parameter of the primary cell wall material, or the fibre homogeneity parameter of the primary cell wall material has an appropriate value can be used to suppress or prevent post-hardening in that frozen confection. The frozen confection typically is of the water-ice type.

Consequently, according to a first aspect, the present invention provides a frozen confection comprising
  a. water
  b. 1 to 40 wt-% of a freezing point depressant
  c. 0.1 to 4 wt-% of defibrillated primary cell wall material comprising microfibrils wherein
    the primary cell wall material is sourced from plant parenchymal tissue,
    at least 80 wt % of the microfibrils is smaller than 50 nm in diameter; and
    the frozen confection has a microfibril availability parameter MAP of at least 0.11 Hz.

Similarly, according to a second aspect, the present invention provides a frozen confection comprising
  a. water
  b. 1 to 40 wt-% of a freezing point depressant
  c. 0.1 to 4 wt-% of defibrillated primary cell wall material comprising microfibrils wherein
    the primary cell wall material is sourced from plant parenchymal tissue,
    at least 80 wt % of the microfibrils is smaller than 50 nm in diameter; and
    the frozen confection has a confection homogeneity parameter CHP of at least 0.022.

Analogously, according to a third aspect, the present invention provides a frozen confection comprising
  a. water
  b. 1 to 40 wt-% of a freezing point depressant
  c. 0.1 to 4 wt-% of defibrillated primary cell wall material comprising microfibrils wherein
    the primary cell wall material is sourced from plant parenchymal tissue,
    at least 80 wt % of the microfibrils is smaller than 50 nm in diameter; and the defibrillated primary cell wall material has a fibre defibrillation parameter FDP of at least 0.10 Hz.

Likewise, according to a fourth aspect, the present invention provides a frozen confection comprising
a. water
b. 1 to 40 wt-% of a freezing point depressant
c. 0.1 to 4 wt-% of defibrillated primary cell wall material comprising microfibrils wherein
the primary cell wall material is sourced from plant parenchymal tissue,
at least 80 wt % of the microfibrils is smaller than 50 nm in diameter; and
the defibrillated primary cell wall material has a fibre homogeneity parameter FHP of at least 0.022.

The frozen confection according to the present invention may inter alia be obtained by the use of a particular method. Thus, according to a fifth aspect, the present invention also provides a method for preparing a frozen confection, wherein the frozen confection comprises
a. water;
b. 1 to 40 wt-% of a freezing point depressant; and
c. 0.1 to 4 wt-% of defibrillated primary cell wall material comprising microfibrils; and wherein
the primary cell wall material is sourced from plant parenchymal tissue,
at least 80 wt % of the microfibrils is smaller than 50 nm in diameter;
and wherein the method comprises the steps of
i. providing a source of primary cell wall material;
ii. dispersing the primary cell wall material in an aqueous phase, thereby to form an aqueous dispersion comprising between 0.1 and 4 wt-% of the primary cell wall material;
iii. treating the aqueous dispersion to obtain a dispersion comprising defibrillated primary cell wall material, whereby the treatment includes a high shear treatment step selected from high pressure homogenisation at a pressure of between 500 and 2000 bar and microfluidising at a pressure of between 500 and 2000 bar;
iv. freezing the confection;
wherein other constituents of the frozen confection are independently mixed into the aqueous phase before step ii, between steps ii and iii, between steps iii and iv or after step iv.

The method according to the invention yields frozen confections exhibiting desirable properties, including reduced or suppressed post-hardening by virtue of the particular structure that results from this method. Accordingly, in a sixth aspect, the present invention also provides a frozen confection obtainable by the method according to the fifth aspect of the invention.

According to a seventh aspect, the invention also relates to use of defibrillated cell wall material comprising microfibrils to reduce post-hardening of a frozen confection comprising water and 1 to 40 wt-% of a freezing point depressant, wherein the frozen confection has a microfibril availability parameter MAP of at least 0.11 Hz.

Similarly, according to a eighth aspect, the invention also relates to use of defibrillated cell wall material comprising microfibrils to reduce post-hardening of a frozen confection comprising water and 1 to 40 wt-% of a freezing point depressant, wherein the frozen confection has a confection homogeneity parameter CHP of at least 0.022.

DETAILED DESCRIPTION OF THE INVENTION

Figure 1:
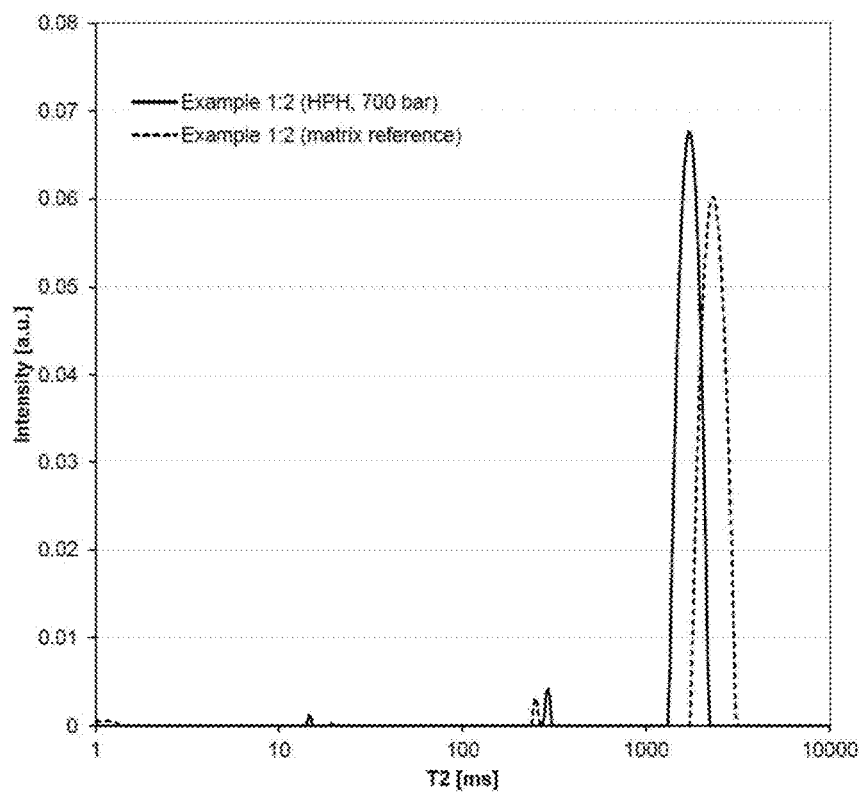
FIG. 1 shows $T_2$ distribution curves of Example 1:2.

Any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Unless specified otherwise, numerical ranges expressed in the format "from x to y" are understood to include x and y. When for a specific feature multiple preferred ranges are described in the format "from x to y", it is understood that all ranges combining the different endpoints are also contemplated. For the purpose of the invention ambient temperature is defined as a temperature of about 20 degrees Celsius.

Frozen Confections

The term frozen confection refers to a packaged or instantly produced composition suitable for human consumption. In a preferred format, the frozen confection according to the present invention is a water ice-based confection. Water ice based confections are typically considered to include non-aerated water ices, aerated water ices, soft water ices (including for instance extrudable compositions) and water ice-based frozen drinks (for instance confections which are flowable and/or suckable at temperatures above −9° C.).

The frozen confection according to any aspect of the invention comprises water and 1 to 40 wt-% of a freezing point depressant. The freezing point depressant may be any freezing point depressant that is suitable for use in frozen confection. Mixtures of such freezing point depressants are also contemplated. It is preferred that the freezing point depressant is selected from the group consisting of monosaccharides, disaccharides, starch hydrolysates, maltodextrins, soluble fibre, polyols and mixtures thereof. The materials used as freezing point depressants often serve not just to reduce the ice content of the frozen beverage at temperatures below the freezing point of water, but also as sweeteners, and as bulk fillers occupying space improving the rheology of the matrix phase. These materials must have a taste and/or flavour which is compatible with the frozen beverage flavour. Examples of suitable monosaccharides are dextrose, fructose and galactose. Examples of suitable disaccharides include sucrose and lactose. An example of suitable starch hydrolysates are glucose syrup, and corn syrup. Examples of soluble fibre include inulin, fructooligosaccharide and polydextrose. Example polyols are erythritol, arabitol, xylitol, sorbitol, mannitol, lactitol, maltitol, cellobiitol and glycerol. Different combinations of these materials may be used depending upon the required final product properties including sweetness, calorie content, texture, ice content, etc.

It is preferred that the freezing point depressant comprises monosaccharides and/or disaccharides. It is even more preferred that the freezing point depressant comprises sucrose, whereby preferably at least 30 wt-% of the freezing point depressant is sucrose, more preferably at least 40 wt-% of the freezing point depressant is sucrose. In some embodiments it is preferred that the freezing point depressant comprises between 30 and 80 wt-%, more preferably between 40 and 60 wt-% of sucrose.

Primary Cell Wall Material

For the purpose of the invention "primary cell wall material" is defined as the cell wall material from which essentially all cold water soluble components have been removed, i.e. at a temperature of around 20 degrees Celsius. This can easily be achieved by washing with water.

The primary cell wall material is sourced (i.e. prepared) from plant parenchymal tissue. The microfibrils in the frozen confection according to the invention are microfibrils obtained from primary cell wall material. The source of the plant parenchyma cells may be any plant that contains plant parenchyma cells having a cellulose skeleton. A plant cell wall typically contains cellulose and hemicellulose, pectin and in many cases lignin. This contrasts with the cell walls of fungi (which are made of chitin), and of bacteria, which are made of peptidoglycan. Primary plant cell walls contain lignin only in minor amounts, if at all. The primary cell wall material used in the frozen confection according to the invention may comprise some lignin, like less than 10 wt % calculated on total amount of cell wall material, but preferably does not contain substantial amounts of lignified tissue. Preferably the primary cell wall material consists essentially of non-lignified tissue as understood by the skilled person in the area of plant biology. Preferably the source of primary cell wall material is selected from parenchymal tissue from fruits, roots, bulbs, tubers, seeds, leaves and combination thereof; more preferably is selected from citrus fruit, tomato fruit, peach fruit, pumpkin fruit, kiwi fruit, apple fruit, mango fruit, sugar beet, beet root, turnip, parsnip, maize, oat, wheat, peas and combinations thereof; and even more preferably is selected from citrus fruit, tomato fruit and combinations thereof. A most preferred source of primary cell wall material is parenchymal tissue from citrus fruit.

The primary cell wall material may optionally have undergone several pre-treatment steps before it is brought in the defibrillated state. Such pre-treatments include but are not limited to heating, cooking, washing, refining, depectinating, as long as the defibrillated cell wall material comprising microfibrils is present in the frozen confection as required by the present invention. Hence, the parenchymal tissue may for instance also be provided in the form of a puree.

Microfibrils

In the context of the present invention, the microfibrils present in or derived from the primary cell wall material, are the strongly self-associated fibrous structures typically found in plant cell walls. In the native plant tissue, they are conventionally present in the form of aggregates from a few tens of nanometres to a few micrometres. These aggregates consist of the elementary microfibrils.

The frozen confection according to the invention comprises 0.1 to 4 wt-% of defibrillated primary cell wall material comprising microfibrils. Here, the wt-% of the total composition is based on the dry weight of the primary cell wall material from which essentially all cold water soluble components have been removed (i.e. the insoluble fraction, which is also understood as the fibre fraction). Preferably, the amount of defibrillated cell wall material in the frozen confection according to the invention is from 0.3 to 2 wt %, more preferably from 0.5 to 1.5 wt % and even more preferably from 0.7 to 1.2 wt %.

Preferably, the microfibrils are obtained from the primary cell wall material by removing soluble and unbound sugars, protein, polysaccharides, oil soluble oils, waxes and phytochemicals (e.g. carotenoids, lycopene). This is suitably achieved using well known techniques including cutting up the cell wall material, cooking, washing, centrifugation, decanting and drying as is well-known to the skilled person.

Preferably the primary cell wall material comprises at least 50 wt-% of microfibrils, more preferably at least 60 wt %, even more preferably at least 70 wt %, still more preferably at least 80 wt %, even still more preferably at least 90 wt % and most preferably the primary cell wall material consists essentially of microfibrils. Here, the wt-% is based on the dry weight of the primary cell wall material and the microfibrils.

Plant cell walls, especially in parenchymal tissue contain hemicelluloses and pectin in addition to cellulose. Thus, the microfibrils in the primary cell wall material may typically comprise cellulose, hemicellulose, and pectin. However, the primary cell wall material of the invention does not necessarily contain hemicellulose and/or pectin. The hemicellulose or part thereof may have been removed when the primary cell wall material is prepared from the plant parenchymal tissue. Therefore, the primary cell wall material of the invention optionally comprises hemicellulose, like for example in an amount of 0 to 40 wt %. Preferably the primary cell wall material comprises hemicelluloses, preferably in an amount of up to 40 wt %, like for example from 5 to 40 wt %, and more preferably in an amount from 10 to 30 wt %.

Likewise the pectin or part thereof may have been removed when the primary cell wall material is prepared from the plant parenchymal tissue. Therefore, the primary cell wall material of the invention optionally comprises pectin, like for example in an amount of 0 to 30 wt %. Preferably the primary cell wall material comprises pectin, preferably in an amount of up to 30 wt %, like for example from 5 to 30 wt %, and more preferably in an amount from 10 to 20 wt %.

Preferably the primary cell wall material of the invention comprises hemicelluloses and pectin.

The primary cell wall material in the frozen confection of the invention comprises defibrillated cell wall material, i.e. the microfibrils that make up the fibers present in the primary cell wall are at least partially disentangled without breaking them. It is the degree of disentanglement that provides the frozen confection of the present invention with its surprising properties. The MAP, FDP, CHP and FHP parameters all correlate to this degree of disentanglement.

Preferably the average length of the microfibrils from the defibrillated primary cell wall material is more than 1 micrometer and preferably more than 5 micrometers.

At least 80 wt % of the microfibrils is smaller than 50 nm in diameter. Preferably at least 80 wt % of the microfibrils is smaller than 40 nm in diameter, more preferably smaller than 30 nm, even more preferably smaller than 20 nm and still more preferably smaller than 10 nm. The microfibril diameter can be suitably determined using the method described in the Examples section below.

The primary cell wall material is suitably defibrillated by subjecting it to mechanical energy and/or cavitation thereby disentangling the cellulose microfibrils. This can be done as part of the process for obtaining the microfibrils from the primary cell wall material, thus resulting in isolated defibrillated cell wall material comprising microfibrils. Alternatively, the primary cell wall material can be combined with one or more of the other ingredients of the frozen confection (including for example the freezing point depressant) wherein the resulting mixture is subjected to mechanical energy and/or cavitation thereby disentangling the microfibrils in the cellulose fibers. The required level of defibrillation can also be arrived at by a succession of various such disentanglement treatments, for example by first subjecting a dispersion of the primary cell wall material to a high shear treatment, and at later stage subjecting the premix of the frozen confection to another high shear treatment. Alternatively, if the pre*-processing of the primary cell wall material provides sufficient disentanglement to yield the required level of defibrillation in the final frozen confection, it may suffice if the manufacturing steps in which the primary cell wall material is combined with the other constituents of the frozen confection include only mixing steps of relatively low shear.

The cellulose in the microfibrils in the defibrillated primary cell wall material in any of the compositions of the present invention preferably has an average degree of crystallinity of less than 50%. Preferably the average degree of crystallinity of the cellulose in the microfibrils is less than 40%, more preferably less than 35% and even more preferably less than 30%. The table below shows the average degree of crystallinity of typical sources of cellulose microfibrils. It shows that the cellulose in primary cell wall material sourced from plant parenchymal tissue typically has a degree of crystallinity of less than 50 wt-%.

TABLE 1

Average degree of crystallinity of cellulose
(all polymorph cellulose I)

| Source | Average degree of crystallinity (%) |
| --- | --- |
| Tomato fibers | 32 |
| Citrus fiber (Citrus Fiber AQ + N) | 29 |
| Nata de Coco | 74 |
| Cotton | 72 |
| Wood pulp fiber (Meadwestvaco) | 61 |
| Sugar beet fibre (Nordix Fibrex) | 21 |
| Pea fibres (PF200vitacel) | 42 |
| Oat fibres (780 Sunopta) | 43 |
| Corn hull (Z-trim) | 48 |
| Sugar cane Fiber (Ultracel) | 49 |

The average degree of crystallinity can be suitably determined according to the method described in the Examples section below.

Microfibril Availability Parameter MAP

According to the first aspect of the invention, the frozen confection has a microfibril availability parameter MAP of at least 0.11 Hz. The MAP provides a measure for the extent to which the primary cell wall material has been defibrillated, based on an NMR (nuclear magnetic resonance) method performed on a standardised sample comprising the defibrillated cell wall material. The MAP of the frozen confection is established by the following protocol. The protocol to establish the parameter includes three parts: sample preparation, NMR measurement to collect CPMG relaxation decay data, and data analysis to calculate the MAP value.

Thus, the protocol includes the sample preparation steps of
a. melting a sample of the frozen confection under storage at 5° C.;
b. preparing 300 ml of a concentration-standardised sample at room temperature from the molten sample, wherein the concentration-standardised sample comprises the microfibrils contained in the defibrillated primary cell wall material at a concentration of 0.100 wt-% with respect to the weight of the standardised sample;
c. evenly distributing the primary cell wall material over the concentration-standardised sample volume by agitating the sample with a Silverson overhead mixer equipped with a small screen having 1 mm holes at 2000 rpm for 60 seconds;
d. adjusting the pH of the concentration-standardised sample to 3.3±0.1;
e. transferring an aliquot of the concentration- and pH-standardised sample to a flat-bottom NMR tube of 10 mm diameter, ensuring a fill height such that upon placement of the sample in the NMR spectrometer of step h, the fill height is within the region where the radiofrequent field of the coil of the NMR spectrometer is homogeneous.

If the frozen confection comprises the defibrillated cell wall material at a level higher than 0.100 wt-%, step b. will include dilution to obtain this level. The sample is preferably kept or made free from larger particulate material, including for instance fruit pieces, fragments of whole or multiple cells and other non-defibrillated material. The distributing step c is intended to provide an even distribution of the microfibril material over the sample volume, whilst having a limited and controlled effect on the level of defibrillation of the sample. In step d, the pH is suitably standardised with the aid of citric acid.

The optimal fill height in step e may depend on the type of NMR spectrometer used, as known by the skilled person. It will typically be about 1 cm.

In the further steps of the protocol, the concentration- and pH-standardised sample will be referred to as the standardised sample.

The data analysis requires comparison of a $T_2$ distribution curve (see below) of the standardised sample with a matrix reference sample, which should preferably be essentially free from cellulose microfibril material. Therefore, the protocol also includes the step of:
f. preparing a matrix reference sample by centrifuging an aliquot of the standardised sample in a 2 ml Eppendorf cup at a relative centrifugal force of 15000 for 10 minutes and transferring the supernatant to a flat-bottom NMR tube of 10 mm diameter, ensuring a fill height such that upon placement of the sample in the NMR spectrometer of step h, the fill height is within the region where the radiofrequent field of the coil of the NMR spectrometer is homogeneous.

Subsequently, to collect and analyse the data, the protocol includes the steps of:
g. equilibrating the NMR tubes at a temperature of 20° C.;
h. recording relaxation decay data for the standardised sample at 20° C. on an NMR spectrometer operating at a proton resonance frequency of 20 MHz, using a CPMG (Carr Purcell Mayboom Gill) $T_2$ relaxation pulse sequence, with a 180° pulse spacing of 200 microseconds, and a recycle delay time of 30 seconds;

i. recording relaxation decay data for the matrix reference sample under the same conditions as in step h;

j. performing inverse Laplace transformation to the obtained decay data for both the standardised sample and the matrix reference sample, requiring $T_2$ to be in the range of 0.01 to 10 seconds;

k. identifying in the $T_2$ distribution curve of the standardised sample the peak corresponding to the water protons of which the $T_2$ is averaged by exchange between the bulk water phase and the surface of the defibrillated primary cell wall material and identifying in the $T_2$ distribution curve of the matrix reference sample the peak corresponding to the bulk water phase;

l. calculating $T_2$(sample), which is defined as the weighted average $T_2$ value for the identified peak in the $T_2$ distribution curve of the standardised sample and similarly calculating $T_2$(matrix) which is defined as the weighted average $T_2$ value for the identified peak in the $T_2$ distribution curve of the matrix reference sample;

m. calculating the values of $R_2$(sample) and $R_2$(matrix), where:

$R_2$(sample)=1/$T_2$(sample), and $R_2$(matrix)=1/$T_2$(matrix);

n. calculating the microfibril availability parameter MAP of the frozen confection as MAP=$R_2$(sample)−$R_2$(matrix).

The CPMG $T_2$ relaxation pulse sequence is well-known in the field of NMR spectroscopy (See *Effects of diffusion on free precession in nuclear magnetic resonance experiments*, Carr, H. Y., Purcell, E. M., *Physical Review*, Volume 94, Issue 3, 1954, Pages 630-638/*Modified spin-echo method for measuring nuclear relaxation times*, Meiboom, S., Gill, D., *Review of Scientific Instruments*, Volume 29, Issue 8, 1958, Pages 688-691) Suitable time domain NMR spectrometers are well-known to perform this type of spectroscopy are well-known. Similarly, the usual measures to ensure the recording of reliable data are well-known in the field of time domain NMR spectroscopy. For example, the field should be sufficiently homogeneous at the locus where the sample volumes are placed. The field homogeneity can be checked by verifying whether a reference sample of pure water, yields a $T_2^*$(T-two-star) for water protons of more than 2 milliseconds.

The inverse Laplace transformation of step j may suitably be carried out using a non-negative least square constraints algorithm lsqnonneg (Lawson, C. L. and R. J. Hanson, *Solving Least Squares Problems*, Prentice-Hall, 1974, Chapter 23, p. 161), with the regularisation parameter lambda set to 0.2. Software packages suitable for implementing the algorithm and carrying out the transform are well-known, Matlab being an example of such software.

In step k the peak that is selected in the $T_2$ distribution curve of the standardised sample, typically is the dominant peak, if the system is sufficiently homogeneous. In those cases there is only one peak in the In general, the peak that should be selected in the $T_2$ distribution curve is that corresponding to water protons of which the $T_2$ is averaged by diffusion and chemical exchange between bulk and surface sites of the defibrillated primary cell wall material. This peak is particularly well-defined if the defibrillated primary cell wall material is evenly distributed over the standardised sample. In most typical cases, there will be only one such peak, as can be seen in the examples in the Examples section below.

The weighted average $T_2$ in step l is for example suitably calculated by the summation $$\frac{\sum I(T_2) \cdot T_2}{\sum I(T_2)}$$

Here, $I(T_2)$ is the intensity at value $T_2$ and both summations are over the width of the peak.

A preferred way of establishing the MAP for the frozen confection is by following the protocol in the way described in the Examples section below. The above protocol and the Examples provide methods of measuring the MAP. However, the MAP may also be determined by a different protocol, as long as that protocol would lead to the same physical result, i.e. it would yield the same MAP for a particular frozen confection as the above protocol.

In summary, the microfibril availability parameter MAP that is determined as described here thus provides a measure for the degree to which the primary cell wall material is defibrillated. Thus, according to this aspect of the invention, the frozen confection has a microfibril availability parameter MAP of at least 0.11 Hz. The frozen confection preferably has a microfibril availability parameter MAP of at least 0.13 Hz and more preferably of at least 0.15 Hz. The frozen confection preferably has a microfibril availability parameter MAP of at most 0.50 Hz, more preferably at most 0.30 Hz and even more preferably at most 0.20 Hz.

The Confection Homogeneity Parameter CHP

According to the second aspect of the invention, the frozen confection has a confection homogeneity parameter CHP of at least 0.022. The CHP provides a measure for the extent to which the primary cell wall material has been defibrillated, based on confocal scanning laser microscopy (CSLM) performed on a standardised sample comprising the defibrillated cell wall material. The CHP of the frozen confection is established by the following protocol. The protocol to establish the parameter includes three parts: sample preparation, CSLM microscopy to obtain micrographs of the sample, and digital image analysis to calculate the CHP value.

Thus, the protocol includes the sample preparation steps of a. melting a sample of the frozen confection under storage at 5° C.;

b. preparing 300 ml of a concentration-standardised sample at room temperature from the molten sample, wherein the concentration-standardised sample comprises the microfibril contained in the defibrillated primary cell wall material at a concentration of 0.100 wt-% with respect to the weight of the standardised sample;

c. evenly distributing the primary cell wall material over the concentration-standardised sample volume by agitating the sample with a Silverson overhead mixer equipped with a small screen having 1 mm holes at 2000 rpm for 60 seconds;

d. dying the microfibrils by providing a 0.5%-w/v aqueous stock solution of Congo Red dye and contacting an aliquot of the standardised sample with an amount of the Congo Red solution, wherein the amount is 1.0 vol-% with respect to the volume of the aliquot of the standardised sample;

e. filling a sample holder suitable for performing CSLM with an aliquot of the dyed standardised sample.

In step d, for example, 2 mL of the standardised sample is contacted with 20 µl of the Congo Red solution. In order to ensure even distribution of the dye throughout the sample, it may for instance be gently shaken.

The sample holder of step e suitably includes two cover slides separated by a spacer comprising a bore of sufficient volume to enable the recording of sufficient micrographs for digital image analysis as described below.

To obtain micrographs, the protocol includes the following step:

f. imaging the dyed standardised sample with a confocal scanning laser microscope equipped with a diode-pumped solid state laser emitting at a wavelength of 561 nm and operated at a fixed laser power, using an oil-immersed 40× objective with a numerical aperture of 1.25, and thereby recording at least 25 independent micrographs at a resolution of 1024×1024 pixels where each pixel represents a sample size of within the range of 350 by 350 nm to 400 by 400 nm, adjusting the intensity and gain settings such that in every image between 0.1 and 5% of the pixels are saturated and recording the micrographs at a colour depth of at least 8 bits per pixel.

The CHP is a measure relating to the primary cell wall material. Therefore, micrographs should be recorded whilst avoiding imaging of air bubbles or the sample edge. Likewise, if the frozen confection comprises macroscopic fruit particles or similar particles, care should be taken not to image these. This may conveniently be accomplished for instance by removing such particles of macroscopic dimensions during sample preparation in step a or by avoiding them in the sample whilst collecting micrographs. Such particles of macroscopic dimensions include for example fruit pieces, fragments of whole or multiple cells and other non-defibrillated material.

Typically, one or more photomultiplier tubes are used as the light detectors in the microscope. Preferably the microscope is equipped with three photomultiplier tubes (PMTs). Independent micrographs are micrographs that are non-overlapping, both in the x-y plane and in the z-direction. The micrographs may suitably be recorded at a colour depth higher than 8 bits (for instance at 24 bit RGB), since this can easily be converted to a lower colour depth by well-known means.

The digital image analysis part of the protocol involves the following steps:

g. ensuring that the micrographs are present as or converted to a format with a single intensity value for each pixel;

h. normalising each individual micrograph by recalculating the pixel values of the image so that the range of pixel values used in the image is equal to the maximum range for the given colour depth, thereby requiring 0.4% of the pixels to become saturated;

i. obtaining for each individual micrograph the image histogram and removing spikes from each histogram by visual inspection;

j. for each individual image histogram determining the full width at half maximum (FWHM), by first determining the maximum count in the histogram and the channel containing this maximum count (the maximum channel), then counting the number N of channels between the first channel containing a value equal or higher than half the maximum and the last channel containing a value equal or higher than half the maximum thereby including this first and last channel in the count N, and then calculating the FWHM by dividing the count N by the total number of channels;

k. calculating the confection homogeneity parameter CHP, wherein CHP is the average of the FWHM values obtained for the individual micrographs.

The digital image analysis steps may suitably be carried out using well-known image analysis software including for instance ImageJ. The result of step g should be that the image is of a format wherein the intensity for each pixel is expressed as a single value. This is for instance the case if the image is a "grey-scale" image. In contrast, images in RGB format or a related format having three intensity values per pixel should be converted. This is easily achieved by well-known operations in the field of digital image analysis. An example of a suitable output format would be a grey-scale image with 8 bits per pixel.

The normalising operation of step h is generally known as a histogram stretch operation. The image histogram of step i is a well-known property for digital images, representing the distribution of the pixels over the possible intensities, by providing the pixel count for each intensity channel. For the purpose of the spike-removal of step i, the value for a particular channel is considered a spike if it is considerably higher than the values of the adjacent channels, typically at least a factor of 1.5 higher. The lower half-maximum channel in step j corresponds to the channel containing a count of half the maximum count that is furthest away from the maximum channel on the low-intensity side of the maximum channel. Analogously, the upper half-maximum channel corresponds to the channel containing a count of half the maximum count that is furthest away from the maximum channel on the high-intensity side of the maximum channel. The FWHM that is obtained in step j will be a value between 0 and 1.

A preferred way of establishing the CHP for the frozen confection is by following the protocol in the way described in the Examples section below. The above protocol and the Examples provide methods of measuring the CHP. However, the CHP may also be determined by a different protocol, as long as that protocol would lead to the same physical result, i.e. it would yield the same CHP for a particular frozen confection as the above protocol.

The frozen confection preferably has a confection homogeneity parameter CHP of at least 0.025, more preferably at least 0.030. Preferably the frozen confection has a confection homogeneity parameter CHP of at most 0.10, more preferably at most 0.07 and even more preferably at most 0.06.

The Fibre Defibrillation Parameter FDP

According to a third aspect of the invention, the degree of defibrillation of the primary cell wall material in the frozen confection is suitably characterised by the fibre defibrillation parameter FDP. Like the MAP, the FDP is measured by an NMR technique, but differs in the way the sample is prepared. The FDP is defined for the defibrillated primary cell wall material dispersed in water. That is, the FDP is determined for the separate primary cell wall material, not for the frozen confection. Thus, the defibrillated primary cell wall material of the frozen confection according to the third aspect of the invention has a fibre defibrillation parameter FDP of at least 0.10 Hz. The defibrillated primary cell wall material preferably has a fibre defibrillation parameter FDP of at least 0.11 Hz, more preferably at least 0.12 Hz, even more preferably at least 0.13 Hz and still more preferably at least 0.15 Hz. The defibrillated primary cell wall material preferably has a fibre defibrillation parameter FDP of at most 0.50 Hz, more preferably at most 0.30 Hz and even more preferably at most 0.20 Hz.

The protocol to establish the parameter includes three parts: sample preparation, NMR measurement to collect CPMG relaxation decay data, and data analysis to calculate the FDP value, analogous to the protocol to establish the MAP.

Thus, the protocol includes the sample preparation steps of a. preparing 300 ml of a concentration-standardised sample at room temperature of the defibrillated primary cell wall material, wherein the concentration-standardised sample comprises the microfibrils contained in the defibrillated primary cell wall material at a concentration of 0.100 wt-% with respect to the weight of the standardised sample;

b. evenly distributing the primary cell wall material over the concentration-standardised sample volume by agitating the sample with a Silverson overhead mixer equipped with a small screen having 1 mm holes at 2000 rpm for 60 seconds;

c. adjusting the pH of the concentration-standardised sample to 3.3±0.1;

d. transferring an aliquot of the concentration- and pH-standardised sample to a flat-bottom NMR tube of 10 mm diameter, ensuring a fill height such that upon placement of the sample in the NMR spectrometer of step h, the fill height is within the region where the radiofrequent field of the coil of the NMR spectrometer is homogeneous.

The standardised sample of the defibrillated primary cell wall material may be prepared in different ways, which may be appropriately selected depending on the preparation conditions of the defibrillated primary cell wall material and/or the frozen confection. Thus for example, the standardised sample may suitably be prepared by using a dispersion consisting essentially of the defibrillated primary cell wall material dispersed in water, wherein the dispersion results from a defibrillation process. This is particularly useful, if the primary cell wall material is subjected to a defibrillation step before it is contacted with other constituents of the frozen confection. A possible alternative is to separate the primary cell wall material from the other constituents of the frozen confection, after the latter has been prepared.

The distributing step b is intended to provide an even distribution of the microfibril material over the sample volume, whilst having a limited and controlled effect on the level of defibrillation of the sample. In step c, the pH is suitably standardised with the aid of citric acid.

The optimal fill height in step d may depend on the type of NMR spectrometer used, as known by the skilled person. It will typically be about 1 cm.

The further parts of the protocol to determine the FDP, namely the matrix reference sample preparation, the data collection and analysis follow the same steps as steps f to n of the protocol described hereinabove for the determination of the MAP, with the proviso that in step n, the fibre defibrillation parameter FDP is calculated as FDP=$R_2$(sample)-$R_2$(matrix).

A preferred way of establishing the FDP for the frozen confection is by following the protocol in the way described in the Examples section below for the MAP, whilst taking into account the above differences between the methods to measure the MAP and the FDP. The above protocol and the Examples provide methods of measuring the FDP. However, the FDP may also be determined by a different protocol, as long as that protocol would lead to the same physical result, i.e. it would yield the same FDP for a particular frozen confection as the above protocol.

The Fibre Homogeneity Parameter FHP

According to a fourth aspect of the invention, the degree of defibrillation of the primary cell wall material in the frozen confection is suitably characterised by the fibre homogeneity parameter FHP. Like the CHP, the FHP is measured based on analysis of CSLM micrographs, but differs in the way the sample is prepared. The FHP is defined for the defibrillated primary cell wall material dispersed in water. That is, the FHP is determined for the separate primary cell wall material, not for the frozen confection.

Thus, the defibrillated primary cell wall material of the frozen confection according to the fourth aspect of the invention has a fibre homogeneity parameter FHP of at least 0.022. The defibrillated primary cell wall material preferably has a fibre homogeneity parameter FHP of at least 0.023, more preferably at least 0.025, even more preferably at least 0.027 and still more preferably at least 0.030. The defibrillated primary cell wall material preferably has a fibre defibrillation parameter FHP of at most 0.10, more preferably at most 0.070 and even more preferably at most 0.060.

The protocol to establish the FHP includes three parts: sample preparation, CSLM microscopy to obtain micrographs of the sample, and digital image analysis to calculate the FHP value, analogous to the protocol to establish the CHP.

Thus, the protocol includes the sample preparation steps of a. preparing 300 ml of a concentration-standardised sample at room temperature of the defibrillated primary cell wall material, wherein the concentration-standardised sample comprises the microfibrils contained in the defibrillated primary cell wall material at a concentration of 0.100 wt-% with respect to the weight of the standardised sample;

b. evenly distributing the primary cell wall material over the concentration-standardised sample volume by agitating the sample with a Silverson overhead mixer equipped with a small screen having 1 mm holes at 2000 rpm for 60 seconds;

c. dying the microfibrils by providing a 0.5%-w/v aqueous stock solution of Congo Red dye and contacting an aliquot of the standardised sample with an amount of the Congo Red solution, wherein the amount is 1.0 vol-% with respect to the volume of the aliquot of the standardised sample;

d. filling a sample holder suitable for performing CSLM with an aliquot of the dyed standardised sample.

The standardised sample of the defibrillated primary cell wall material may be prepared in different ways, which may be appropriately selected depending on the preparation conditions of the defibrillated primary cell wall material and/or the frozen confection. Thus for example, the standardised sample may suitably be prepared by using a dispersion consisting essentially of the defibrillated primary cell wall material dispersed in water, wherein the dispersion results from a defibrillation process. This is particularly useful, if the primary cell wall material is subjected to a defibrillation step before it is contacted with other constituents of the frozen confection. A possible alternative is to separate the primary cell wall material from the other constituents of the frozen confection, after the latter has been prepared.

The further parts of the protocol to determine the FHP, namely the microscopy and the digital image analysis follow the same steps as steps f to k of the protocol described hereinabove for the determination of the CHP, with the proviso that in step k, the fibre homogeneity parameter FHP is calculated as the average of the FWHM values obtained for the individual micrographs.

A preferred way of establishing the FHP for the frozen confection is by following the protocol in the way described in the Examples section below for the CHP, whilst taking into account the above differences between the methods to measure the CHP and the FHP. The above protocol and the Examples provide methods of measuring the FHP. However, the FHP may also be determined by a different protocol, as long as that protocol would lead to the same physical result, i.e. it would yield the same FHP for a particular frozen confection as the above protocol.

Combination of Parameters

Frozen confections wherein the above-specified requirements for the MAP, CHP, FDP, FHP are simultaneously satisfied for more than one of the MAP, CHP, FDP, and FHP are also contemplated. For example, a frozen confection wherein the microfibril availability parameter MAP has a value as specified hereinabove and simultaneously a confection homogeneity parameter CHP as defined hereinabove is preferred. Likewise, a frozen confection wherein the microfibril availability parameter FDP has a value as specified hereinabove and simultaneously a confection homogeneity parameter FHP as defined hereinabove is also preferred. Similarly, other combinations of one or more of the MAP, CHP, FDP and the FHP are preferred.

Other Ingredients of the Frozen Confection

The frozen confection according to any aspect of the invention may comprise any other ingredients that are usual in frozen confections of the type of the present invention. Thus, it may particularly comprise ingredients that are usual in frozen confections of the water ice type.

Although the frozen confection may contain oils or fats, it preferably contains them in limited amounts. Thus, the frozen confection preferably comprises 0 to 10 wt-% of a fat that is solid at a temperature of −20° C. Even more preferably, the frozen confection comprises 0 to 3 wt-% of a fat that is solid at a temperature of −20° C. It is even more preferred that the frozen confection does not contain added dairy fat. It is still more preferred that the frozen confection is substantially free from fat.

The frozen confection may suitably comprise emulsifiers, stabilisers or hydrocolloids in addition to the components introduced as part of the defibrillated primary cell wall material. Suitable emulsifiers and stabilisers include for example the emulsifiers and stabilisers specified in Arbuckle, W. S., Ice Cream, 5$^{th}$ Edition, AVI Publishing, 1996, ch 6, p 71-79.

Ice Structuring Proteins

Ice structuring proteins (ISPs) may suitably be used to enhance the refreezing properties of the frozen confection. However, it is a known drawback of IPSs that they tend to increase the hardness of a frozen confection, especially if the confection is a water ice or similar confection. It has now surprisingly been found that this drawback can be overcome, without losing the benefits of using IPSs, when a frozen confection comprises the defibrillated primary cell wall material of the present invention in combination with ISPs.

Ice structuring proteins (ISPs) are proteins that can influence the shape and size of the crystals of ice formed when freezing occurs, and inhibit recrystallisation of ice (Clarke et al.; Cryoletters 23: 89-92 (2002)). Many of these proteins were identified originally in organisms that live in sub-zero environments and are thought to protect the organism from the deleterious effects of the formation of ice crystals in the cells of the organism. For this reason many ice structuring proteins are also known as antifreeze proteins (AFPs). In the context of the present invention, an ISP is defined as a protein that has ice recrystallisation inhibitory (RI) activity.

ISPs for use in frozen confections according to the present invention can be derived from any source provided they are suitable for inclusion in food products. ISPs have been identified to date in fish, plants, lichen, fungi, micro-organisms and insects. In addition, a number of synthetic ISPs have been described. Suitable ISPs and sources thereof are described in WO2005/058058.

The frozen confection of the present invention preferably comprises ice structuring protein. More preferably, it comprises at least 0.0005 wt-% of the ISP. ISPs can be used at very low concentrations and therefore preferably, the frozen confection comprises less than 0.05 wt-% ISP. More preferably, it comprises from 0.001 to 0.01 wt-% of ISP, and even more preferably from 0.005 to 0.01 wt %.

Frozen Confections with Several Parts

The frozen confection according to any aspect of the present invention may be consumer-ready product that is intended and suitable for consumption, or may be part of the final product. The latter may be the case when the final product contains only a part that is a frozen confection as described herein and another part that is a different type of frozen confection. For example, the final product may have a core or a coating of a different type of frozen confection, or for instance have non-icy finish, such as a chocolate layer. Such confections comprising frozen confection materials of different formats are also considered here.

Hardness

In the frozen confections according to the invention post-hardening after manufacture is surprisingly reduced or suppressed while other desirable characteristics are typically maintained. Therefore, the frozen confection preferably has a penetrometric hardness of less than 5 N, more preferably less than 4 N, and even more preferably less than 3 N, after storage at −10° C. (minus ten degrees C.) for at least three days. Similarly, the frozen confection preferably has a penetrometric hardness of less than 100 N, more preferably less than 75 N, and even more preferably less than 50 N, after storage at −18° C. (minus eighteen degrees C.) for at least ninety days. The penetrometric hardness is measured by penetrometry, as the maximum force required using a probe of 2 mm diameter, a penetration speed of 2 mm/s and a penetration depth of 10 mm. The penetrometric hardness is suitably measured as described in the Examples section.

Method for Preparing a Frozen Confection

According to the fifth aspect, the invention relates to a method for preparing a frozen confection as defined hereinabove. A frozen confection made according to the present method surprisingly displays reduced or suppressed post-hardening upon storage under freezing conditions. These surprising properties are believed to be due to the particular processing conditions and their effect on the primary cell wall material comprising cellulose microfibrils.

The method according to the invention is a method, wherein the frozen confection comprises
  a. water;
  b. 1 to 40 wt-% of a freezing point depressant; and
  c. 0.1 to 4 wt-% of defibrillated primary cell wall material comprising microfibrils; and wherein
     the primary cell wall material is sourced from plant parenchymal tissue; and at least 80 wt % of the cellulose microfibrils is smaller than 50 nm in diameter;

The method is preferably a method for preparing a frozen confection according to the invention as described hereinabove. Thus, any preferences regarding the frozen confection according to the invention apply here too. The method preferably is a method for preparing a frozen confection in the form of a water ice. In particular it is preferred that it is a method for preparing a frozen confection according to the first aspect of the invention, or according to the second aspect of the invention, or according to the third aspect of the invention, or according to the fourth aspect of the invention.

The primary cell wall material of step i is preferably sourced as indicated for the frozen confection above. It is particularly preferred that the primary cell wall material includes citrus fibre.

Step ii of the method involves dispersing the primary cell wall material in an aqueous phase. Any method to disperse the primary cell wall material is considered, as long as it yields a dispersion that is suitable for the treatment in step iii. Thus, the dispersion step may involve stirring, mixing, or another treatment of relatively low shear, such as treatment with an overhead or inline Silverson mixer.

The aqueous dispersion of step ii comprises between 0.1 and 4 wt-% of the primary cell wall material. Preferably, it comprises between 0.1 and 3 wt-%, more preferably between 0.5 and 1.5 wt-% of the primary cell wall material.

The treatment of step iii to obtain a dispersion comprising defibrillated primary cell wall material involves subjecting the primary cell wall material to mechanical shearing and/or cavitation. To this effect, the treatment includes a high shear treatment step selected from high pressure homogenisation at a pressure of between 500 and 2000 bar and microfluidising at a pressure of between 500 and 2000 bar.

Both high pressure homogenisation and microfluidisation are well-known techniques, involving well-known equipment. Preferably, the high shear treatment step is high pressure homogenisation as specified, more preferably, it is high pressure homogenisation at a pressure of between 500 and 1000 bar, and even more preferably at a pressure of between 600 and 800 bar.

Thus, it is especially preferred that the aqueous phase of step ii comprises between 0.5 and 1.5 wt-% of the primary cell wall material and the high shear treatment step of step iii is high pressure homogenisation at a pressure of between 600 and 800 bar.

The precise pressure and the number of passes and/or stages of the treatment—be it high pressure homogenisation or microfluidisation—that is required to obtain the benefits of the present invention may depend for instance on the concentration of the primary cell wall material present and on its level of comminution/pre-treatment before this step, but is easily determined by experimentation. The treatment in step iii is preferably such that upon this treatment the fibre defibrillation parameter FDP of the defibrillated primary cell wall material is at least 0.10 Hz. Here the fibre defibrillation parameter FDP is defined and determined as described above. The defibrillated primary cell wall material preferably has a fibre defibrillation parameter FDP of at least 0.11 Hz, more preferably at least 0.12 Hz, even more preferably at least 0.13 Hz and still more preferably at least 0.15 Hz. The defibrillated primary cell wall material preferably has a fibre defibrillation parameter FDP of at most 0.50 Hz, more preferably at most 0.30 Hz and even more preferably at most 0.20 Hz.

Similarly, it is also preferred that the treatment in step iii is such that upon this treatment the fibre homogeneity parameter FHP of the defibrillated primary cell wall material is at least 0.022. Here the fibre defibrillation parameter FHP is defined and determined as described above. The defibrillated primary cell wall material preferably has a fibre homogeneity parameter FHP of at least 0.023, more preferably at least 0.025, even more preferably at least 0.027 and still more preferably at least 0.030. The defibrillated primary cell wall material preferably has a fibre defibrillation parameter FHP of at most 0.10, more preferably at most 0.070 and even more preferably at most 0.060.

The FDP and/or FHP can in particular be conveniently determined if the aqueous phase consists substantially of water and primary cell wall material, since in that case, the sample preparation step of the protocols to determine the FDP and/or FHP are relatively straight-forward.

Surprisingly beneficial properties of the frozen confection made by the present method (in terms of reduced or suppressed posthardening whilst maintaining other desirable properties) are obtained when the treatment in step iii is such that the above preferred requirements for the FDP and/or the FHP are met.

Step iv of the method involves freezing the confection. Any suitable method of freezing is contemplated. Thus, the freezing step may include for example one or more of quiescent freezing, blast-freezing, quick-freezing, scraped freezing, which are all well-known in the field of frozen confection manufacture.

Constituents of the frozen confection other than the primary cell wall material are independently mixed into the aqueous phase before step ii, between steps ii and iii, between steps iii and iv or after step iv. The other constituents can be mixed at the stage that is most convenient and/or efficient depending on the type of constituents and the water ice format in case as will be known and appreciated by the skilled person. The only requirement is that the aqueous dispersion in step iii is suitable for the treatment it is subjected to.

The method according to the invention may suitably involve other routine steps and equipment that are usual and well-known in the field of frozen confection manufacture, in particular in the field of water ice manufacture.

The present invention also provides a method for preparing a frozen confection, wherein the frozen confection comprises
  a. water;
  b. 1 to 40 wt-% of a freezing point depressant; and
  c. 0.1 to 4 wt-% of defibrillated primary cell wall material comprising microfibrils; and wherein
    the primary cell wall material is sourced from plant parenchymal tissue; and
    at least 80 wt % of the microfibrils is smaller than 50 nm in diameter; and wherein the method comprises the steps of
  i. providing a source of primary cell wall material;
  ii. dispersing the primary cell wall material in an aqueous phase, thereby to form an aqueous dispersion comprising between 0.1 and 4 wt-% of the primary cell wall material;
  iii. treating the aqueous dispersion to obtain a dispersion comprising defibrillated primary cell wall material, whereby the treatment includes one or more high shear treatment steps and wherein the treatment is such that the fibre defibrillation parameter FDP of the defibrillated primary cell wall material is at least 0.10 Hz or the fibre homogeneity parameter FHP of the defibrillated primary cell wall material is at least 0.022;
  iv. freezing the confection;
  wherein other constituents of the frozen confection are independently mixed into the aqueous phase before step ii, between steps ii and iii, between steps iii and iv or after step iv.

The preferences and considerations relating to the method according to the fifth aspect of the invention similarly apply to this method. Thus, for instance, the treatment of step iii typically involves one or more high-shear treatments selected from high pressure homogenisation and microfluidising. For this method any number and order of such treatment steps is contemplated as long as the requirements of the FDP and/or FHP are met for the resulting frozen confection. Other steps may be present in between such multiple shearing steps, including for example the mixing in of other ingredients.

Frozen Confection Obtainable by the Method of the Invention

According to the sixth aspect, the present invention relates to a frozen confection obtainable by the method according to the fifth aspect of the invention, because the method according to the invention yields frozen confections exhibiting desirable properties, including reduced or suppressed post-hardening by virtue of the particular structure that results from this method. It is preferred that this frozen confection is obtainable by this method wherein the aqueous dispersion of step ii comprises between 0.5 and 1.5 wt-% of the primary cell wall material and the high shear treatment step of step iii is high pressure homogenisation at a pressure of between 600 and 800 bar.

Likewise, it is preferred that the confection is obtainable by the method according to the invention, wherein the treatment in step iii is preferably such that upon this treatment the fibre defibrillation parameter FDP of the defibrillated primary cell wall material is at least 0.10 Hz. Here the fibre defibrillation parameter FDP is defined and determined as described above. The defibrillated primary cell wall material preferably has a fibre defibrillation parameter FDP of at least 0.11 Hz, more preferably at least 0.12 Hz, even more preferably at least 0.13 Hz and still more preferably at least 0.15 Hz. The defibrillated primary cell wall material preferably has a fibre defibrillation parameter FDP of at most 0.50 Hz, more preferably at most 0.30 Hz and even more preferably at most 0.20 Hz.

Similarly, it is preferred that the confection is obtainable by the method according to the invention, wherein the treatment in step iii is such that upon this treatment the fibre homogeneity parameter FHP of the defibrillated primary cell wall material is at least 0.022. Here the fibre defibrillation parameter FHP is defined and determined as described above. The defibrillated primary cell wall material preferably has a fibre homogeneity parameter FHP of at least 0.023, more preferably at least 0.025, even more preferably at least 0.027 and still more preferably at least 0.030. The defibrillated primary cell wall material preferably has a fibre defibrillation parameter FHP of at most 0.10, more preferably at most 0.070 and even more preferably at most 0.060.

Uses According to the Present Invention

The invention also relates to use of defibrillated cell wall material comprising cellulose microfibrils to reduce post-hardening of a frozen confection comprising water and 1 to 40 wt-% of a freezing point depressant, wherein the frozen confection has a microfibril availability parameter MAP of at least 0.11 Hz. Here, the frozen confection preferably has a microfibril availability parameter MAP of at least 0.13 Hz and more preferably of at least 0.15 Hz. The frozen confection preferably has a microfibril availability parameter MAP of at most 0.50 Hz, more preferably at most 0.30 Hz and even more preferably at most 0.20 Hz.

The invention also relates to use of defibrillated cell wall material comprising cellulose microfibrils to reduce post-hardening of a frozen confection comprising water and 1 to 40 wt-% of a freezing point depressant, wherein the frozen confection has a confection homogeneity parameter CHP of at least 0.022. Here, the frozen confection preferably has a homogeneity parameter HP of at least 0.025, more preferably at least 0.030. Preferably the frozen confection has a homogeneity parameter HP of at most 0.10, more preferably at most 0.07 and even more preferably at most 0.06.

The invention also relates to use of defibrillated cell wall material comprising cellulose microfibrils to reduce post-hardening of a frozen confection comprising water and 1 to 40 wt-% of a freezing point depressant, wherein the defibrillated cell wall material has a fibre defibrillation parameter FDP of at least 0.010 Hz. The defibrillated primary cell wall material preferably has a fibre defibrillation parameter FDP of at least 0.11 Hz, more preferably at least 0.12 Hz, even more preferably at least 0.13 Hz and still more preferably at least 0.15 Hz. The defibrillated primary cell wall material preferably has a fibre defibrillation parameter FDP of at most 0.50 Hz, more preferably at most 0.30 Hz and even more preferably at most 0.20 Hz.

The invention also relates to use of defibrillated cell wall material comprising cellulose microfibrils to reduce post-hardening of a frozen confection comprising water and 1 to 40 wt-% of a freezing point depressant, wherein the defibrillated cell wall material has a fibre homogeneity parameter FHP of at least 0.022. The defibrillated primary cell wall material preferably has a fibre homogeneity parameter FHP of at least 0.023, more preferably at least 0.025, even more preferably at least 0.027 and still more preferably at least 0.030. The defibrillated primary cell wall material preferably has a fibre defibrillation parameter FHP of at most 0.10, more preferably at most 0.070 and even more preferably at most 0.060.

Examples

The invention can be better understood by virtue of the following non-limiting examples.

General

Microfibril Characterisation: Degree of Crystallinity of Cellulose Microfibrils

Wide angle X-ray scattering (WAXS) is used to determine the degree of crystallinity, using the following protocol. The measurements were performed on a Bruker D8 Discover X-ray diffractometer with GADDS (General Area Detector Diffraction System) (From Bruker-AXS, Delft, NL) (Part No: 882-014900 Serial No: 02-826) in a theta/theta configuration. A copper anode was used, and the K-alpha radiation with wavelength 0.15418 nm was selected. The instrumental parameters as used are shown in the table below.

TABLE 2

| D8 Discover instrumental parameters for WAXS measurements | |
|---|---|
| | $2\theta$ (9-42°) |
| Theta 1 | 10.000 |
| Theta 2 | 10.000/25.000 |
| Detector Bias (kV/mA) | 40/40 |
| Time (sec) | 300 |
| Collimator (mm) | 0.3 |
| Detector distance (cm) | 25 |
| Tube Anode | Cu |

The degree of crystallinity $X_c$ was calculated from the following equation:

$$Xc(\%) = \frac{\text{Area crystalline phase}}{\text{Area crystalline} + \text{amorphous phase}} * 100\%$$

The areas of the diffraction lines of the crystalline phase were separated from the area of the amorphous phase by using the Bruker EVA software (version 12.0).

Microfibril Characterisation: Diameter of Cellulose Microfibrils

Transmission electron microscopy (TEM) was used to directly determine the diameter of the cellulose microfibrils (D. Harris et. al. Tools for Cellulose Analysis in Plant Cell Walls Plant Physiology, 2010(153), 420). The dispersion of plant source rich in primary cell wall material was diluted in distilled water resulting in a thin layer of mostly single fibers or single clusters of fibers. The dispersions were imaged on a Carbon only 300 mesh Copper TEM grid (Agar Scientific) and imaged using a Tecnai 20 Transmission electron microscope (FEI Company) operated at a voltage of 200 kV. To enhance image contrast between individual microfibrils, a 2% phosphotungstic acid solution at pH 5.2 was used as a negative stain. For this the fiber-loaded TEM grids were incubated on 2% phosphotungstic acid and air-dried after removal of the excess of fluid.

Centrifugation Force

Where the centrifugation force is given, it is given as a dimensional "relative centrifugal force", which is defined as $r\omega^2/g$, where $g=9.8$ m/s$^2$ is the Earth's gravitational acceleration, r is the rotational radius of the centrifuge, $\omega$ is the angular velocity in radians per unit time. The angular velocity is $\omega=\text{rpm}\times 2\pi/60$, where rpm is the centrifuge "revolutions per minute".

Example 1—Frozen Confection Comprising Citrus Fibre

Water ice compositions comprising citrus fibre with different values of the microfibril availability parameter MAP and homogeneity parameter HP were prepared. The hardness after storage was compared.

Water Ice Premix Preparation

To purified water (Millipore) at room temperature sucrose was added (20 wt % on total formulation). The mixture was stirred until all sucrose was dissolved. Next, 0.8 wt-% of citrus fibre in powder form (Herbacel AQ+ Type N ex Herbafood Ingredients GmbH) was added and the mixture was stirred using Silverson L4RT-A overhead stirrer with a screen with circular holes of 1 mm at 3500 rpm for 10 minutes. Each example composition 1:1 to 1:3 was prepared by passing a part of the dispersion over a high pressure homogeniser (Niro Soavi NS 1001 L), at a pressure of 500 bar (Example 1:1), 700 bar (Example 1:2), and 1000 bar (Example 1:3), respectively. Example 1:4 was prepared by passing part of the dispersion over a Microfluidizer (M110-S from Microfluidics) at 1200 bar using a G10Z interaction chamber. Here, the water bath of the Microfluidizer was not cooled (no water in the cooling bath). All homogenised compositions were collected in 1000 ml plastic beakers and stored overnight at 5° C.

Comparative Premix Preparation

Comparative example 1:A was prepared by adding sucrose (20 wt % on total formulation) to purified water (Millipore) and stirring until all sucrose dissolved. Next, 0.8 wt-% of citrus fibre in powder form (Herbacel AQ+ Type N ex Herbafood Ingredients GmbH) was added and the mixture was stirred using a Silverson L4RT-A overhead stirrer with a screen with circular holes of 1 mm at 3500 rpm for 10 minutes.

Comparative example 1:B was prepared by adding sucrose (20 wt % on total formulation) to purified water (Millipore) and stirring until all sucrose dissolved. Next, 0.8 wt-% of citrus fibre in powder form (Herbacel AQ+ Type N ex Herbafood Ingredients GmbH) was added and the mixture was stirred using a blade stirrer at 200 rpm for 10 minutes. The sample was then passed over a high pressure homogeniser (Niro Soavi NS 1001 L), at a pressure of 140 bar.

Water Ice Preparation

Water ices were prepared from the above example premixes and comparative example premixes. In each case, 500 grams of the dispersion was put into a gelato machine (Gelato Chef 2500) and frozen (with stirring) to −3° C. The water ices that were thus obtained were put in sample vials (height 68 mm, diameter 33 mm). About 50 ml water ice was put in each vial and stored at −10° C. for three days.

Water Ice Characterisation I: Determination of the Microfibril Availability Parameter MAP.

The microfibril availability parameter MAP was determined for the water ices of each of the examples 1:1-1:3, and comparative examples 1:A and 1:B. The method to establish the parameter includes three parts: sample preparation, NMR measurement to collect CPMG relaxation data, and data analysis to calculate the MAP value.

MAP—Sample Preparation

Vials with water ices were taken from the freezer (−10° C.) and stored for one night at 5° C. to melt. Molten ice samples were diluted to a citrus fibre concentration of 0.100 wt-% by taking 37.5 grams of sample and adding 262.5 grams of demineralised water at room temperature in a 500 ml plastic beaker. The mixture was stirred using a Silverson L4RT-A overhead mixer (small screen, 1 mm holes) at 2000 rpm for 60 seconds in a beaker of 80 mm diameter. This mixing step ensures that the citrus fibre is evenly distributed over the diluted sample volume. Finally the pH was adjusted to 3.3 with citric acid.

An aliquot of the resulting diluted and pH-standardised sample was transferred directly to a 18 cm flat bottom NMR tube of 10 mm diameter at a filling height of 1 cm. In order to do a background correction, another aliquot was centrifuged (Eppendorf Centrifuge 5416) at a relative centrifugation force of 15000 for 10 min. in a 2 ml Eppendorf cup, from which the top layer without fibre (matrix) was subsequently transferred to another 18 cm flat bottom NMR tube at a filling height of 1 cm, which we refer to as a matrix reference sample. Both samples and matrix reference samples were incubated and equilibrated at 20° C. for 10 min. prior to the measurement.

MAP—Measurement

CPMG relaxation decay data were collected for each sample and for each matrix reference sample. A Bruker MQ20 Minispec was deployed operating at a resonance frequency for protons of 20 MHz, equipped with a variable temperature probehead stabilised at 20° C. Measurements were performed using a CPMG (Carr Purcell Mayboom Gill) $T_2$ relaxation pulse sequence to observe the relaxation decay at 20° C. (See *Effects of diffusion on free precession in nuclear magnetic resonance experiments*, Carr, H. Y., Purcell, E. M., *Physical Review*, Volume 94, Issue 3, 1954, Pages 630-638/*Modified spin-echo method for measuring nuclear relaxation times*, Meiboom, S., Gill, D., *Review of Scientific Instruments*, Volume 29, Issue 8, 1958, Pages 688-691). Data were collected with the 180° pulse spacing set to 200 μs, a recycle delay time of 30 sec., a 180°-pulse length of 5 μs (microseconds) and using 14.7 k 180°-pulses. The sequence deploys a phase cycle and complex mode detection. Prior to measurement, the suitability of the NMR system for these measurements (in terms of field homogeneity etc.) was checked by verifying that the $T_2^*$ of pure water was >2 ms.

MAP—Data Analysis

Data were processed with Matlab using a singular value decomposition to phase correct the quadrature data ("*Towards rapid and unique curve resolution of low-field NMR relaxation data: trilinear SLICING versus two-dimensional curve fitting*", Pedersen, H. T., Bro, R., Engelsen, S. B., *Journal of Magnetic Resonance*. August 2002; 157(1), Pages 141-155. DOI: 10.1006/jmre.2002.2570). The resulting, phase-corrected data were Inverse Laplace Transformed into a $T_2$ spectrum using the Matlab non-negative least square constraints function lsqnonneg (Lawson, C. L. and R. J. Hanson, *Solving Least Squares Problems*, Prentice-Hall, 1974, Chapter 23, p. 161) with boundaries set for $T_2$, requiring $T_2$ to be in the range of 0.01 to 10 seconds and with the regularisation parameter lambda set to 0.2.

Figure 2:
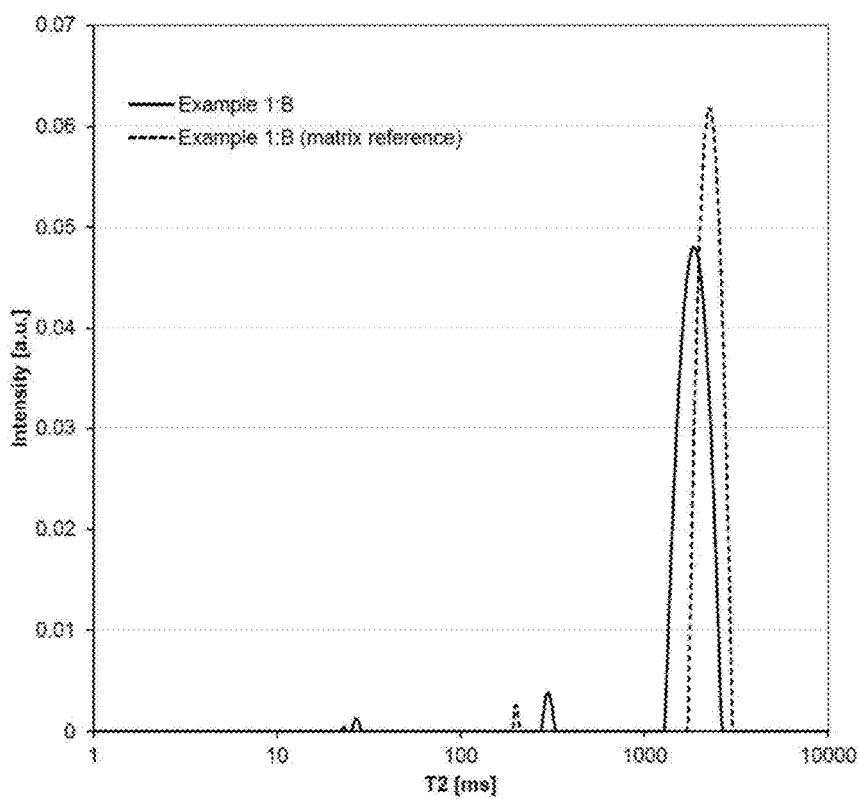
FIG. 2 shows $T_2$ distribution curves of Comparative Example 1:B.

FIG. 1 shows the $T_2$ distribution curves resulting from the inverse Laplace transform for the sample of Example 1:2 and the corresponding matrix reference sample, respectively. FIG. 2 shows the $T_2$ distribution curves resulting from the inverse Laplace transform for the sample of Comparative Example 1:B and the corresponding matrix reference sample, respectively.

For every sample, the data were treated as follows to obtain the MAP: In the $T_2$ distribution curve for a particular sample, the peak corresponding to the water protons of which $T_2$ is averaged by exchange between the bulk water phase and the surface of the defibrillated primary cell wall material was identified. It is believed that the exchange (and resulting averaging) is due to diffusion and chemical exchange between bulk and cellulose surface sites. As can be seen in the spectra in FIGS. 1 and 2, in the present case, the peaks of the bulk water phase were easily distinguished, as they were the peaks with the highest intensity. The peak corresponding to the bulk water phase in the matrix reference sample was similarly identified.

The average $T_2$ value was determined by calculating the intensity-weighted average of the peak.

$R_2$ is defined as the inverse of this average $T_2$, i.e. $R_2=1/T_2$ and is expressed in Hz. The microfibril availability parameter MAP for a given sample is calculated as the difference between $R_2$ of the sample and $R_2$ of the matrix reference sample:

MAP=$R_2$(sample)−$R_2$(matrix reference)

Thus, MAP is a measure for the bulk water interaction with the available microfibril surface (K. R. Brownstein, C. E. Tarr, *Journal of Magnetic Resonance* (1969) Volume 26, Issue 1, April 1977, Pages 17-24). The characterisation of the examples in terms of their MAP is presented in Table 3.

TABLE 3

The microfibril availability parameter

| Example | MAP (Hz) | standard deviation |
| --- | --- | --- |
| 1:A | 0.066 | 0.001 |
| 1:B | 0.097 | 0.002 |
| 1:1 | 0.139 | 0.003 |
| 1:2 | 0.152 | 0.003 |

TABLE 3-continued

The microfibril availability parameter

| Example | MAP (Hz) | standard deviation |
| --- | --- | --- |
| 1:3 | 0.160 | 0.003 |
| 1:4 | 0.172 | 0.003 |

Water Ice Characterisation II: Determination of the Confection Homogeneity Parameter CHP The confection homogeneity parameter CHP was determined for the water ices of each of the examples 1:1-1:3, and comparative examples 1:A and 1:B. The protocol to establish the parameter includes three parts: sample preparation, confocal scanning laser microscopy (CSLM), and digital image analysis to calculate the CHP value.

CHP—Sample Preparation Vials with water ices were taken from the freezer (−10° C.) and stored for one night at 5° C. to melt. Molten ice samples were diluted to a citrus fibre concentration of 0.100 wt-% by taking 37.5 grams of the example composition and adding 262.5 grams of demineralised water at room temperature in a 500 ml plastic beaker. The mixture was stirred in a beaker of 80 mm diameter using a Silverson L4RT-A overhead mixer (small screen, 1 mm holes) at 2000 rpm for 60 seconds. This mixing step ensures that the citrus fibre is evenly distributed over the diluted sample volume.

For each example, a volume of 2 mL of the resulting diluted sample was taken with a Finn pipette (Labsystems 4500, H37095) and deposited in an Eppendorf safelock tube. To this 20 μL of a 0.5 w/v % aqueous solution of Congo Red dye was added with a Finn pipette (Labsystems 4027, H56580). The sample was gently shaken to distribute the dye. For imaging, a sample holder was filled with the dyed sample material. The sample holder consisted of two cover slides separated by a spacer. The spacer was a rectangular glass slide of 3 mm thick with a circular hole (0.5 cm diameter) in which the sample could be deposited.

CHP—Confocal Scanning Laser Microscopy

Confocal scanning laser microscopy (CSLM) was performed on a Leica TCS-SP5 confocal microscope in combination with a DMI6000 inverted microscope frame. The Diode-Pumped-Solid-State (DPSS) 561 laser emitting at 561 nm was used at a fixed laser power of 58% for imaging with the Congo red dye. For detection, the system is equipped with three PMT (photomultiplier tube) detectors.

Images were taken with an oil-immersed 40× objective with a numerical aperture of 1.25 (section thickness 0.968 μm), using Leica Immersion oil without auto fluorescence conforming to DIN 58884/ISO 8036/1. A tile scan of 5 by 5 images at a single depth was performed to yield 25 non-overlapping images for analysis. Care was taken not to image the edges of the sample holder; images were taken at a few micrometres distance from the edge. When samples contained air bubbles care was taken to only record images that did not contain any bubbles in the field of view. The PMTs were adjusted by using the "smart gain" and "smart offset" options to prevent over-saturation of the images. Intensity and gain were then adjusted such that between 0.1 and 5% of the pixels are saturated. The resolution of the images was set to 1024 by 1024 pixels and a line averaging of 3 was used. Each pixel represented a sample area of 378.8 by 378.8 nm. After imaging, the individual pictures that make up the tile scan were exported as tiff files with a colour depth of 24 bit RGB without incorporating any scale bar (the reconstructed larger tile images were not used in the image analysis).

Figure 3:
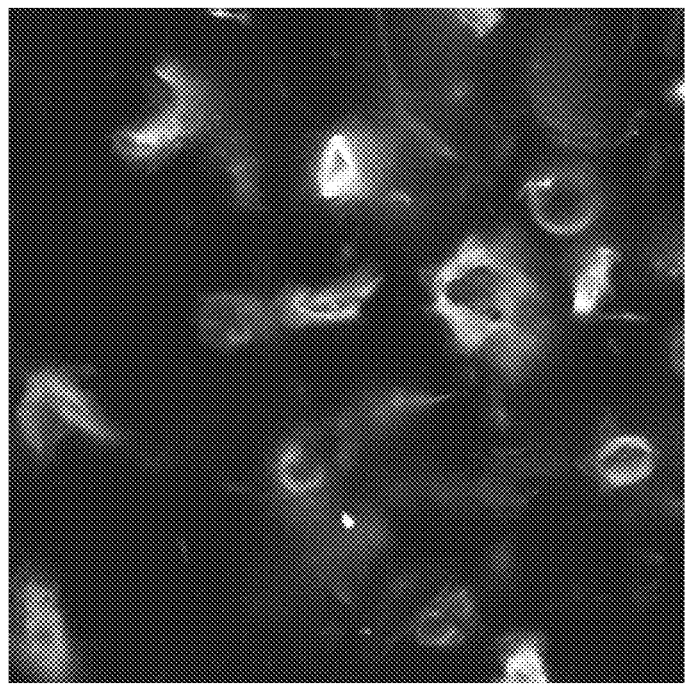
FIG. 3 shows a confocal scanning laser micrograph of Comparative Example 1:B.
Figure 4:
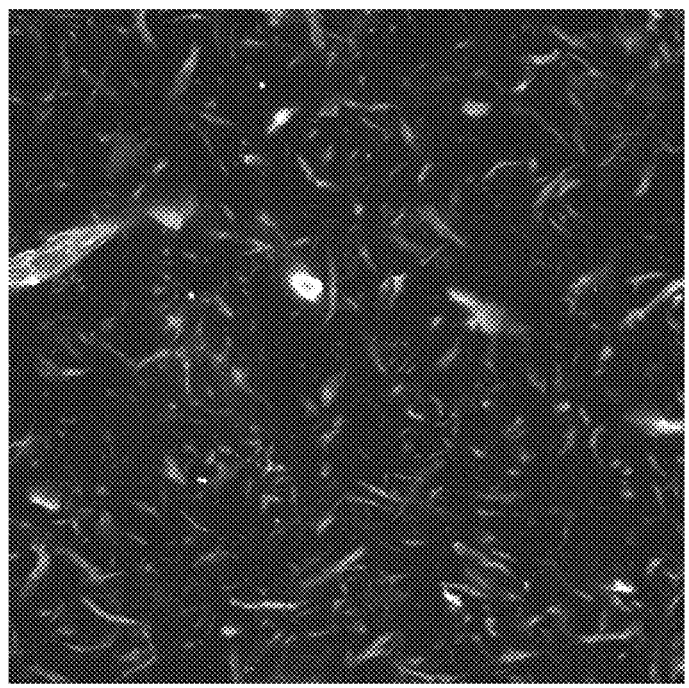
FIG. 4 shows a confocal scanning laser micrograph of Example 1:2.
Figure 5:
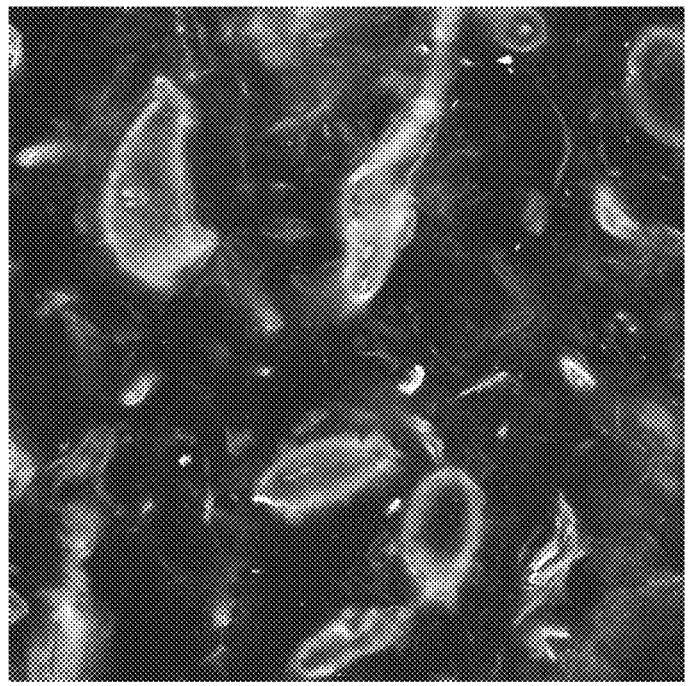
FIG. 5 shows a confocal scanning laser micrograph of Comparative Example 1:B.
Figure 6:
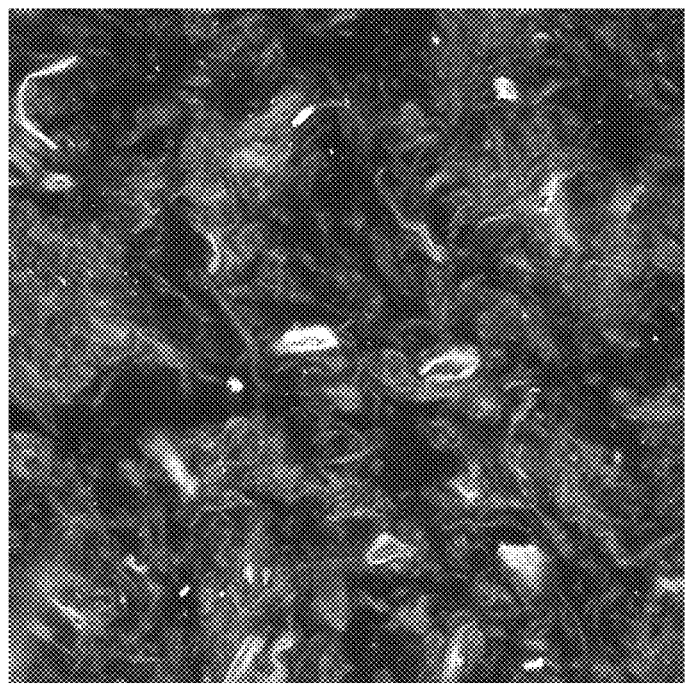
FIG. 6 shows a confocal scanning laser micrograph of Example 1:2.

The difference between examples according to the invention and comparative examples is clearly visible in micrographs. FIG. 3 shows a micrograph of the sample (at 0.10 wt-%) of Comparative Example 1:B, recorded with the above settings. FIG. 4 shows a micrograph of the sample (at 0.10 wt-%) of Example 1:2, recorded under the same conditions. Likewise, FIG. 5 shows a micrograph of another sample of Comparative Example 1:B, omitting the dilution step (i.e. at 0.8 wt-%), but otherwise treated and imaged as above-described. Likewise, FIG. 6 shows a micrograph of a sample of Example 1:2 omitting the dilution step (i.e. at 0.8 wt-%), but otherwise treated and imaged as above-described. All four micrographs represent a sample area of 387.5 by 387.5 μm.

CHP—Digital Image Analysis

For the image analysis the program ImageJ (freeware downloadable from: http://rsbweb.nih.gov/ij/) was used together with Microsoft Excel. Each image was converted to an 8 bit grey scale before analysis. In the analysis, images are first normalized (i.e. a histogram stretch) using the "enhanced contrast" option of ImageJ, allowing 0.4% of the pixels to become saturated. After this procedure, the histogram containing the distribution of pixel intensities was calculated. The resulting list containing the number of pixels per channel, in which each channel represents one of the 256 grey scale values in the image was transferred to Microsoft Excel. Before determination of the maximum of the distribution, spikes/outliers were removed from the obtained histogram by visual inspection, considering that a channel displaying a spike has a considerably larger value than the channels immediately adjacent to it (~2 times or higher). When the histogram displays a smooth distribution, the value of the spike is larger than the maximum of this distribution and located on the right or left of the true maximum. After removal, the maximum of the distribution is determined and divided by two. The full width at half maximum (FWHM) was determined by counting the channels that have a value higher or equal to half the maximum. Any channel containing a zero value that is adjacent to a channel with a count higher than half the maximum is included in the count. The obtained channel count is divided by 256 to yield a FWHM number between 0 and 1 for each individual image. The confection homogeneity parameter is then calculated as the arithmetic average of the FWHM values obtained for the individual images of a particular sample. The reported error is the standard deviation of this average. The characterisation of the examples in terms of their CHP is summarised in Table 4.

TABLE 4

| Confection homogeneity parameter CHP | | |
|---|---|---|
| Sample name | FWHM | standard deviation |
| 1:A | 0.0119 | 0.0024 |
| 1:B | 0.0225 | 0.0044 |
| 1:1 | 0.0308 | 0.0023 |
| 1:2 | 0.0344 | 0.0028 |
| 1:3 | 0.0378 | 0.0050 |
| 1:4 | 0.0583 | 0.0044 |

Water Ice Properties: Evaluation of Post-Hardening

The hardness of the frozen and stored samples was determined using penetrometry using a Texture Analyzer penetrometer (Stable Micro Systems. TA XT Plus) equipped with a 2 mm diameter probe and a temperature control chamber that was kept at 0° C. using Peltier plate cooling (Stable Micro Systems, Peltier Plate Controller). A sample vial was taken from the freezer and analysed immediately. Penetration speed was 2 mm/s and penetration depth was set at 10 mm. During the 10 mm penetration the required force is measured. The maximum force measured during the 10 mm penetration was used to characterize the hardness. For each sample this was done 5 times measuring at least 5 mm from the wall of the sample vial and with at least 5 mm between different measurement positions. The average values obtained for each example and comparative example are reported in Table 5.

TABLE 5

| Hardness of the water ices upon storage at −10° C. for three days | | |
|---|---|---|
| | Maximum force (N) | standard deviation |
| 1:A | 11.74 | 1.68 |
| 1:B | 4.17 | 0.35 |
| 1:1 | 2.80 | 0.49 |
| 1:2 | 2.07 | 0.30 |
| 1:3 | 2.69 | 0.48 |
| 1:4 | 3.24 | 0.50 |

The results presented in Table 5 show that hardness as measured by the maximum penetration force (in N) was significantly reduced in compositions according to the present invention, that comprise defibrillated primary cell wall material and have a MAP or CHP within the range according to the present invention. With increasing content of microfibrillated plant cell wall material additional hardness reduction was found.

Example 2: Water Ice Comprising ISP and Defibrillated Citrus Fibre

Premix Preparation

Composition and preparation details are summarised for all examples in Table 6. Demineralized water is heated to boiling using an electric water cooker. Next, sucrose is added. Citrus fibres (Herbacel AQ+ Type N ex Herbafood) are added under stirring using a Silverson LR4T-A overhead stirrer (small screen, 1 mm holes) at 3500 rpm for 5 minutes in a plastic beaker of 2000 ml and 135 mm diameter. The resulting dispersion is either passed over a high pressure homogeniser (HPH) at 500 bar (1st step is 450 bar, 2nd step is 50 bar or passed over a Microfluidizer M-110S (ex Microfluidics, MF) using a G10Z chamber at 1200 bar, as indicated in Table 6. The water bath of the microfluidizer was not cooled (no water in bath). Products were collected in 1000 ml PET bottles. Bottles were put up side down for 10 minutes. Next bottles were put in ice water to cool down to 5° C. For those samples comprising ice-structuring protein (ISP), the next step was adding ISP (ISP type II, C259, ex Fermpro, 16.2 g/l stock solution) via manual stirring cooled dispersion. In those cases, 3.47 g of the ISP stock solution is added to 746.53 g of the premix (total weight is 750 grams). Products are stored overnight at 5° C., prior to the water ice preparation.

Comparative example 2:A was a water ice without defibrillated citrus fibre material. Comparative example 2:B was a water ice comprising ISP but no defibrillated citrus fibre material.

TABLE 6

Composition and hardness of water ice based confections comprising ISP.

| | | | | | Hardness (N) | | | |
|---|---|---|---|---|---|---|---|---|
| | | | | | After 4 | | After 90 | |
| | Sucrose | Fibre | ISP | Processing | bars | days | S.D. | days | S.D. |
| | (wt-%) | (wt-%) | (wt-%) | type | | | | | |
| 2:A | 20 | 0.00 | 0.00 | — | 0 | 111.3 | 5.3 | 122.6 | 7.4 |
| 2:1 | 20 | 0.80 | 0.00 | HPH | 500 | 48.4 | 3.8 | 61.0 | 4.0 |
| 2:2 | 20 | 0.80 | 0.00 | MF | 1200 | 39.4 | 2.9 | 33.8 | 5.9 |
| 2:B | 20 | 0.00 | 0.0075 | — | 0 | 172.2 | 5.8 | 165.9 | 5.1 |
| 2:3 | 20 | 0.80 | 0.0075 | HPH | 500 | 87.2 | 5.3 | 81.2 | 2.8 |
| 2:4 | 20 | 0.80 | 0.0075 | MF | 1200 | 82.1 | 5.3 | 70.3 | 2.5 |

Water Ice Preparation

For every example, an amount of 700 grams of the premix was put into a gelato machine (Gelatissimo Nemox) and frozen (with stirring) until stirring is stopped or when the formed ice mass does not mix anymore during stirring. In general this takes about 20 to 40 minutes. The resulting water ices were stored at −18° C. in portions of 50 ml in 55 ml plastic vials.

Hardness Measurement

The hardness of the water ices upon storage was analysed as described in Example 1 above. The hardness of the water ices after storage at −18° C. for 4 days and 90 days, respectively, is provided in Table 6. Comparison of comparative examples 2:A and 2:B shows that ISP leads to considerably increased post-hardening. Examples 2:3 and 2:4 demonstrate that the defibrillated primary cell wall material can reduce the post-hardening of water ices, despite the presence of the ice-structuring protein.

The invention claimed is:

1. A frozen confection comprising
   a. water
   b. 1 to 40 wt-% of a freezing point depressant
   c. 0.1 to 4 wt-% of defibrillated primary cell wall material comprising microfibrils
   wherein
      the primary cell wall material is sourced from plant parenchymal tissue,
      at least 80 wt % of the microfibrils is smaller than 50 nm in diameter; and
   wherein the frozen confection has
      a microfibril availability parameter MAP of at least 0.11 Hz, or
      a confection homogeneity parameter CHP of at least 0.022;
   or wherein the defibrillated primary cell wall material has
      a fiber defibrillation parameter FDP of at least 0.10 Hz, or
      a fiber homogeneity parameter FHP of at least 0.022
   and wherein the microfibril availability parameter MAP, the confection homogeneity parameter CHP, the fibre defibrillation parameter FDP, and the fiber homogeneity parameter FHP are established by the protocols as described in the description.

2. Frozen confection according to claim 1 comprising 0 to 3 wt-% of a fat that is solid at a temperature of −20° C.

3. Frozen confection according to claim 1 wherein the freezing point depressant is selected from the group consisting of monosaccharides, disaccharides, starch hydrolysates, maltodextrins, soluble fibre, polyols and mixtures thereof.

4. Frozen confection according to claim 1 also comprising ice structuring protein.

5. A method for preparing a frozen confection, wherein the frozen confection comprises
   a. water;
   b. 1 to 40 wt-% of a freezing point depressant; and
   c. 0.1 to 4 wt-% of defibrillated primary cell wall material comprising microfibrils;
   and wherein
      the primary cell wall material is sourced from plant parenchymal tissue,
      at least 80 wt % of the microfibrils is smaller than 50 nm in diameter;
   and wherein the method comprises the steps of
   i. providing a source of primary cell wall material;
   ii. dispersing the primary cell wall material in an aqueous phase, thereby to form an aqueous dispersion comprising between 0.1 and 4 wt-% of the primary cell wall material;
   iii. treating the aqueous dispersion to obtain a dispersion comprising defibrillated primary cell wall material, whereby the treatment includes a high shear treatment step selected from high pressure homogenisation at a pressure of between 500 and 2000 bar and microfluidising at a pressure of between 500 and 2000 bar;
   iv. freezing the confection;
   wherein other constituents of the frozen confection are independently mixed into the aqueous phase before step ii, between steps ii and iii, between steps iii and iv or after step iv.

6. Method according to claim 5, wherein the aqueous dispersion of step ii comprises between 0.1 and 3 wt-%, preferably between 0.5 and 1.5 wt-% of the primary cell wall material.

7. Method according to claim 5 wherein the high shear treatment step is high pressure homogenisation at a pressure of between 500 and 1000 bar, more preferably between 600 and 800 bar.

8. Method according to claim 5 wherein the treatment in step iii is such that upon this treatment the fiber defibrillation parameter FDP of the defibrillated primary cell wall material is at least 0.10 Hz; and wherein the fiber defibrillation parameter FDP is established by the protocol as described in the description.

9. Method according to claim 5 wherein the treatment in step iii is such that upon this treatment the fiber homogeneity parameter FHP of the defibrillated primary cell wall material is at least 0.022; and wherein the fiber homogeneity parameter FHP is established by the protocol as described in the description.

10. A frozen confection obtainable by the method according to claim 5.

11. Use of defibrillated cell wall material comprising microfibrils to reduce post-hardening of a frozen confection comprising water and 1 to 40 wt-% of a freezing point depressant, wherein the frozen confection has a microfibril availability parameter MAP of at least 0.11 Hz; and wherein the microfibril availability parameter MAP is established by the protocol as described in the description.

12. Use of defibrillated cell wall material comprising microfibrils to reduce post-hardening of a frozen confection comprising water and 1 to 40 wt-% of a freezing point depressant, wherein the frozen confection has a confection homogeneity parameter CHP of at least 0.022; and wherein the confection homogeneity parameter CHP is established by the protocol as described in the description.

* * * * *